(12) United States Patent
Scharner

(10) Patent No.: US 11,217,849 B2
(45) Date of Patent: Jan. 4, 2022

(54) BATTERY UNIT FOR A TRACTION BATTERY AND TRACTION BATTERY

(71) Applicant: Bayerische Motoren Werke Aktiengesellschaft, Munich (DE)

(72) Inventor: Sebastian Scharner, Tuerkenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 143 days.

(21) Appl. No.: 16/441,069

(22) Filed: Jun. 14, 2019

(65) Prior Publication Data

US 2019/0296293 A1  Sep. 26, 2019

Related U.S. Application Data

(63) Continuation of application No. PCT/EP2017/077395, filed on Oct. 26, 2017.

(30) Foreign Application Priority Data

Dec. 15, 2016 (DE) .................... 10 2016 225 057.4

(51) Int. Cl.
*H01M 50/20* (2021.01)
*H01M 50/35* (2021.01)
(Continued)

(52) U.S. Cl.
CPC ......... *H01M 50/20* (2021.01); *H01M 50/204* (2021.01); *H01M 50/249* (2021.01);
(Continued)

(58) Field of Classification Search
CPC ............................................ H01M 50/35–367
See application file for complete search history.

(56) References Cited

U.S. PATENT DOCUMENTS

2013/0095356 A1    4/2013 Shimizu et al.
2014/0370336 A1*  12/2014 Reitzle .............. H01M 50/3425
                                                                    429/56
(Continued)

FOREIGN PATENT DOCUMENTS

DE    10 2014 212 173 A1    1/2016
EP         2 493 005 A1         8/2012
(Continued)

OTHER PUBLICATIONS

"Vermiculite." Merriam-Webster.com Dictionary, Merriam-Webster, https://www.merriam-webster.com/dictionary/vermiculite. Accessed Dec. 19, 2020. (Year: 2020).*
(Continued)

*Primary Examiner* — Robert S Carrico
(74) *Attorney, Agent, or Firm* — Crowell & Moring LLP

(57) ABSTRACT

A battery unit for a traction battery of a motor vehicle is provided. The battery unit includes at least two battery cells arranged adjacent to one another, which each include at least one venting unit for venting the cell housing thereof. The venting units are arranged on sides of the battery cells that are facing each other, and at least two shield units are arranged between the sides of the battery cells that face each other and at a distance from one another. Each shield unit includes a shield wall having at least one opening and at least one closure element. The opening of each shield wall is arranged aligned with the venting unit of the battery cell arranged closest to this shield wall in each case. The closure element, in a closing position, in which the closure element closes the opening, is arranged fully against the shield wall and in an open position, in which the closure element at least partially reveals the opening, is at least partially separated from the shield wall. The closure element can be transferred from the closing position into the open position by the action (Continued)

thereon of a force directed in the direction of the other shield unit.

15 Claims, 2 Drawing Sheets

(51) Int. Cl.
    *H01M 50/317*     (2021.01)
    *H01M 50/333*     (2021.01)
    *H01M 50/204*     (2021.01)
    *H01M 50/249*     (2021.01)
    *H01M 10/0525*     (2010.01)

(52) U.S. Cl.
    CPC ....... *H01M 50/317* (2021.01); *H01M 50/333* (2021.01); *H01M 50/35* (2021.01); *H01M 10/0525* (2013.01); *H01M 2220/20* (2013.01)

(56) References Cited

U.S. PATENT DOCUMENTS

2015/0064514 A1* 3/2015 Wu ..................... H01M 2/1241
                                                      429/56
2017/0373287 A1   12/2017 Yamashita et al.

FOREIGN PATENT DOCUMENTS

| | | |
|---|---|---|
| EP | 2 927 988 A2 | 10/2015 |
| GB | 2476 A | 9/1913 |
| JP | 2007220508 A * | 8/2007 |
| JP | 2012-119138 A | 6/2012 |
| JP | 2012-199186 A | 10/2012 |
| JP | 2012-204193 A | 10/2012 |
| JP | 2012199186 A * | 10/2012 |
| JP | 2015-18706 A | 1/2015 |
| WO | WO 2012/133710 A1 | 10/2012 |
| WO | WO 2016/121368 A1 | 8/2016 |

OTHER PUBLICATIONS

Machine Translation of JP 2007-220508 A (Year: 2007).*
Machine Translation of JP 2012-204193 A (Year: 2012).*
International Search Report (PCT/ISA/210) issued in PCT Application No. PCT/EP2017/077395 dated Mar. 29, 2018 with English translation (nine pages).
German-language Written Opinion (PCT/ISA/237) issued in PCT Application No. PCT/EP2017/077395 dated Mar. 29, 2018 (17 pages).
German-language Search Report issued in counterpart German Application No. 10 2016 225 057.4 dated Oct. 20, 2017 with partial English translation (14 pages).

* cited by examiner

BATTERY UNIT FOR A TRACTION BATTERY AND TRACTION BATTERY

CROSS REFERENCE TO RELATED APPLICATIONS

This application is a continuation of PCT International Application No. PCT/EP2017/077395, filed Oct. 26, 2017, which claims priority under 35 U.S.C. § 119 from German Patent Application No. 10 2016 225 057.4, filed Dec. 15, 2016, the entire disclosures of which are herein expressly incorporated by reference.

BACKGROUND AND SUMMARY OF THE INVENTION

The invention relates to a battery unit for a traction battery of a motor vehicle, including at least two battery cells arranged adjacently to one another, each of which includes at least one venting unit for venting the cell housing thereof, wherein the venting units are arranged on mutually facing sides of the battery cells.

The invention further relates to a traction battery for a motor vehicle.

Nowadays, in electromobility applications, electric traction batteries having a high voltage level are predominantly employed in electrically powered vehicles. Lithium-ion technology constitutes the basis of high-voltage stores (HVS) of this type. Many different options are available for the configuration of lithium-ion battery cells in high-voltage stores of this type. In the technical field, there is a prevailing trend for the development of lithium-ion battery cells with an increasingly high quantity of energy per unit of volume (energy density).

The thermal stability of many lithium-ion battery cells behaves in an inversely proportional manner to the quantity of energy stored per unit of volume. Many existing high-voltage stores are still not equipped with any safety features to guard against the error propagation of thermal events. In a high-voltage store, a battery cell which experiences an internal short-circuit may then release heat exponentially (a thermal event), and transmit this heat to adjoining cells.

In future energy stores, it is intended that the energy density of energy storage cells should be increased to 200 Wh/kg or higher. The quantity of heat associated with a thermal event in such an energy storage cell would then be sufficient to cause the propagation thereof to adjoining cells. In order to prevent this, additional safety measures need to be provided in the energy store, in order to ensure the safety thereof in this critical situation.

There is consequently a need for safety precautions in future high-voltage stores which will have a higher energy density.

An object of the invention is the enhancement of the safety of a battery unit for a traction battery of a vehicle.

This and other objects are fulfilled by a battery unit for a traction battery of a motor vehicle according to embodiments of the invention. Advantageous configurations are represented in the following description, the patent claims and the figures, wherein these configurations, respectively in their own right or in various mutual combinations of at least two of said configurations, may constitute a further, specifically also a preferred or advantageous aspect of the invention. Configurations of the battery unit may correspond to configurations of the traction battery and vice versa, even where no explicit reference to any such individual case is included hereinafter.

A battery unit according to an embodiment of the invention for a traction battery of a motor vehicle includes at least two battery cells arranged adjacently to one another, which each include at least one venting unit for venting the cell housing thereof. The venting units are arranged on mutually facing sides of the battery cells, and at least two shield units are arranged between the mutually facing sides of the battery cells that face each other and are arranged at a distance from one another. Each shield unit includes a shield wall having at least one opening and at least one closure element. The opening of each shield wall is arranged in alignment with the venting unit of the battery cell arranged closest to said shield wall in each case. The closure element of the respective shield wall, in a closed position in which the closure element closes the opening, is arranged entirely against the shield wall and, in an open position, in which the closure element at least partially reveals the opening, is at least partially separated from said shield wall. The closure element of the respective shield wall can be transferred from the closed position into the open position by the action thereon of a force directed in the direction of the other shield unit.

In the event of an internal short-circuit in a battery cell of the battery unit, the battery cell may undergo thermal runaway, or irreversible thermal escalation. A hot gas is generated in the battery cell as a result. Upon the achievement of a specific internal pressure within a cell housing of the battery cell, the venting unit of the battery cell opens in an abrupt manner. Hot gas exiting the cell housing by way of the venting unit abruptly contacts the closure unit of the shield unit closest to the battery cell which is arranged closest to the open venting unit. As a result, a force is applied to the closure element which is oriented in the direction of the other shield unit, such that said closure element is moved from its closed position to its designated open position. Accordingly, hot gas exiting the battery cell can be evacuated by the shield unit which is arranged closest to said battery cell, without the exposure to hot gas of further battery cells, which are arranged in a row with said battery cell and are connected in series with said battery cell. This prevents any thermal runaway of further battery cells in this cell row. As the closure unit or closure units of the shield unit which is/are arranged closest to the other battery cell or to the other battery cells are in the closed position, and are not exposed to a load from the hot gas which is oriented in a direction in which these closure units can be transferred from their closed position to their open position, these battery cells, which are arranged in a further adjoining cell row, are likewise not exposed to the hot gas. This prevents any thermal runaway of the further battery cells in this adjoining cell row. Instead, the hot gas can be directed via a duct which is formed between the two shield units, and thus evacuated from the battery unit, with no resulting thermal runaway of further battery cells in the battery unit. The safety of the battery unit is enhanced accordingly.

The battery unit may also include two or more battery cells, wherein at least two battery cells can be combined respectively to form a respective cell row. The battery unit may thus include two cell rows of series-connected battery cells, wherein the battery cells in one cell row are arranged adjacently to the battery cells in the other cell row. The shield units are then arranged between the cell rows. The battery cells may specifically be configured as lithium-ion battery cells, having a high energy density.

By way of the venting unit, in the event of the thermal runaway of a battery cell, the cell housing of this battery cell can be vented, in order to prevent the explosion of said battery cell. The respective venting unit may be configured in the manner of a valve and, upon the opening thereof in response to an internal pressure within the cell housing of the battery cell, may be reversibly actuated or destroyed. As the venting units are arranged on mutually facing sides of the battery cells or of the cell rows constituted by the latter, hot gas evacuated from a battery cell undergoing thermal runaway flows, via the venting unit thereof, in the direction of the adjacently arranged battery cell or battery cells.

The shield units may be arranged in parallel to one another. The shield wall of the respective shield unit functions as a heat shield, in order to protect the battery cell or battery cells which are arranged closest to the respective shield unit against heat from hot gases which are discharged from an adjoining battery cell which is undergoing thermal runaway. As the opening in the respective shield wall is arranged in alignment with the venting unit of the battery cell which is arranged closest to said shield wall, hot gas exiting the venting unit follows the shortest path to the opening, and to the closure unit which is arranged thereupon. If this closure unit is in the open position, virtually the entire quantity of hot gas is fed through the open opening. Preferably, the number of openings and closure elements in a shield unit corresponds to the number of battery cells arranged closest to said shield unit.

If the closure element, in its open position, in which said closure element partially or entirely exposes the opening associated therewith, is at least partially separated from the shield wall, this signifies that said closure element, in its open position, is not connected in any way to the shield wall, or can be entirely separated from said shield wall. As the closure element of the respective shield wall is transferable from the closed position to the open position by the application thereto of a force which is oriented in the direction of the other shield unit, the closure element cannot be transferred from its closed position to its open position by hot gas escaping from an adjoining battery cell which is undergoing thermal runaway. Accordingly, the at least one battery cell arranged closest to this shield unit is reliably protected against said hot gas.

The respective shield wall and the respective closure element are preferably formed of a non-combustible and heat-resistant material which, in the interests of weight reduction, preferably has the lowest possible specific density. The respective closure unit, configured to a varying size and geometry, may be connected to the respective shield wall in a variety of ways. To this end, structures incorporating at least one spring element are also possible, which tensions the closure element in the direction of its closed position.

The motor vehicle may be an electric vehicle or a hybrid vehicle in the form of a land vehicle, a water craft of an aircraft.

By way of an embodiment of the invention, adjoining battery cells in the same or adjoining battery modules can be protected, in which thermal runaway would otherwise be induced by a battery cell undergoing thermal runaway. For the purposes of future technical safety requirements, it is anticipated that a high-voltage store, in the event of an internal cell defect and with effect from the notification of an alarm signal to a person, will generate no external fire or explosion for at least five minutes. This can be reliably achieved by way of embodiments of the present invention.

According to an advantageous configuration, at least one shield wall is at least partially formed by a mica board. A mica board is non-combustible and heat-resistant, and has a very low specific density, such that the employment of a mica board as a shield wall further enhances the safety of the battery unit, without significantly increasing the weight of said battery unit. It is also possible for both respective shield walls to be partially or entirely formed by a mica board, or by two or more mica boards.

According to a further advantageous configuration, at least one closure unit is at least partially formed by a mica board. A mica board is non-combustible and heat-resistant, and has a very low specific density, such that the employment of a mica board for the closure unit further enhances the safety of the battery unit, without significantly increasing the weight of said battery unit. It is also possible for two or more, specifically all the closure units to be partially or entirely formed by a mica board, or by two or more mica boards.

According to a further advantageous configuration, at least one closure unit is configured as a flap. Accordingly, the closure unit is connected to the respective shield wall in an articulated arrangement, such that the closure unit can be pivoted from its closed position to its open position, and vice versa. By this arrangement, the respective shield wall can be re-used after the opening of an opening. Two or more, or specifically all the closure units may respectively be configured as a flap.

According to a further advantageous configuration, at least one closure unit, in its closed position, is connected to the shield wall by way of at least one clamping mechanism. By this arrangement, the closed position of the closure element may be secured, thereby preventing any unintentional opening of the respective opening associated with the closure unit. The clamping mechanism may be configured, for example, as a latching mechanism, a plug-in mechanism or similar, or by way of a compression. Two or more, or specifically all the closure units may be connected to their respective shield wall by way of a respective clamping mechanism.

According to a further advantageous configuration, at least one closure unit, in its closed position, is adhesively bonded to the respective shield wall. By this arrangement, the closed position of the closure element may be secured, thereby preventing any unintentional opening of the respective opening associated with the closure unit. Two or more, or specifically all the closure units may respectively be adhesively bonded to their respective shield wall.

According to a further advantageous configuration, at least one closure unit is connected to the respective shield wall by way of at least one hinge. By this arrangement, the closure unit may be configured as a flap which, by way of the hinge, is pivotably mounted on the respective shield wall. Two or more, or specifically all the closure units may be respectively connected to the respective shield wall by way of one or more hinges.

According to a further advantageous configuration, the hinge is configured as a film hinge or an adhesive tape. These constitute cost-effective and weight-saving configurations of the hinge.

According to a further advantageous configuration, the venting unit incorporates at least one rupture membrane. The rupture membrane preferably includes at least one predetermined breaking point or line of fracture, such that the rupture membrane fails if a mechanical load limit value is exceeded. A rupture membrane permits the cost-effective and weight-saving configuration of the venting unit. Two or more, or specifically all the venting units may respectively include at least one rupture membrane.

A traction battery according to the invention for a motor vehicle includes at least one battery unit according to at least one of the above-mentioned configurations, or any preferred combination of at least two of said configurations.

The advantages described above with reference to the battery unit are correspondingly associated with the traction battery. By way of the traction battery, at least one electric drive unit of the vehicle may be supplied with electrical energy. The traction battery may also include two or more battery units.

The invention is described in an exemplary manner hereinafter, with reference to the preferred exemplary embodiments in the attached figures, wherein the characteristics described hereinafter, both in their own right and in various mutual combinations, may constitute an aspect of the further development of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical components, or components having an identical function, are identified by the same reference numbers.

Figure 1:
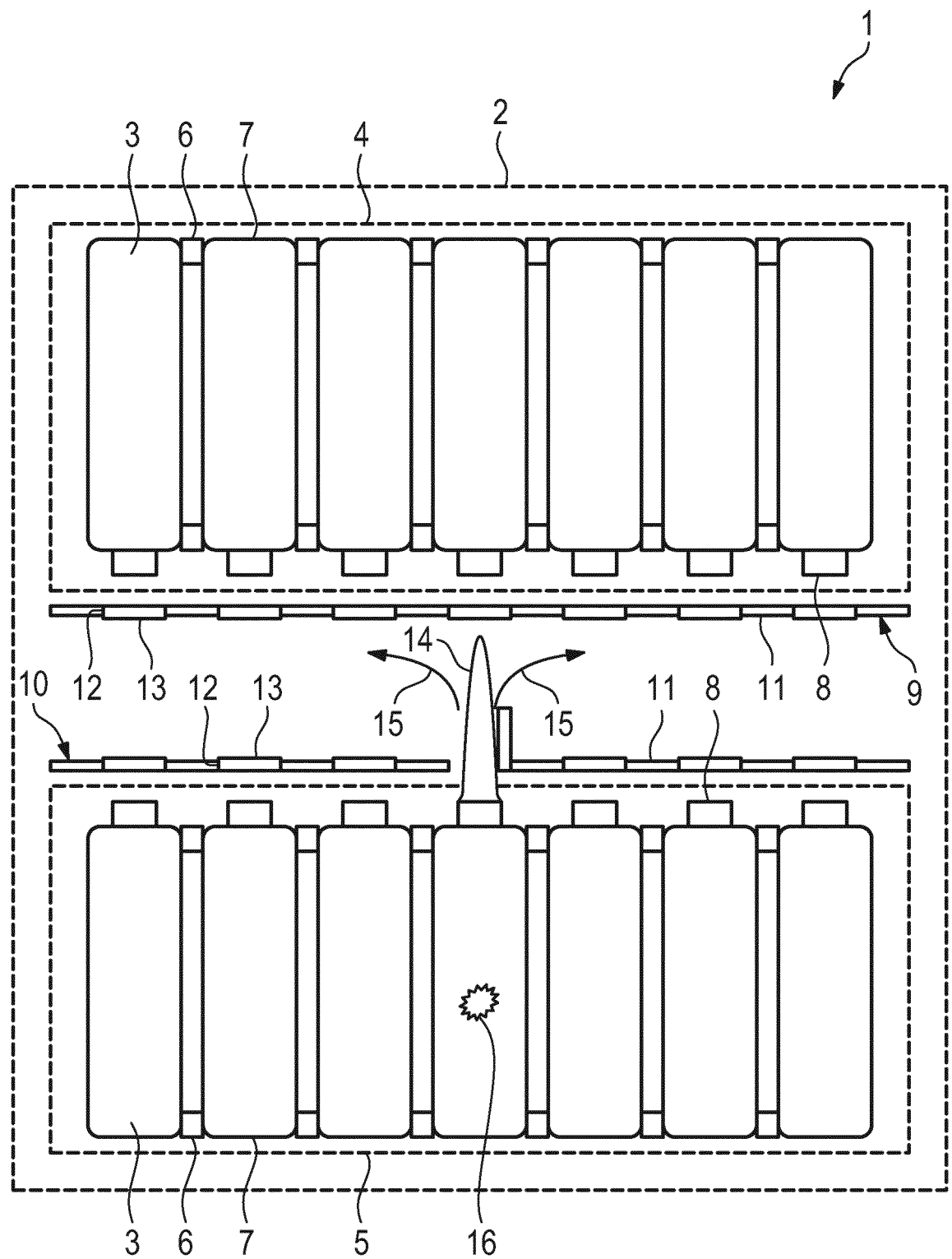
FIG. 1 is a schematic representation of an exemplary embodiment of a traction battery according to the invention.

FIG. 1 shows a schematic representation of an exemplary embodiment of a traction battery 1 according to the invention for a vehicle which is not represented. The traction battery 1 includes a battery unit 2. Alternatively, the traction battery 1 may include two or more battery units 2, although this arrangement is not represented.

The battery unit 2 includes a plurality of battery cells 3, wherein seven battery cells 3 in each case are combined to constitute a cell row 4 or 5. Within each battery cell row 4, 5, the battery cells 3 are mutually spaced by way of spacer elements 6. The battery cells 3 in cell row 4 are arranged adjacently to the battery cells 3 in cell row 5.

Each battery cell 3 includes a cell housing 7 and a venting unit 8, which is arranged on the cell housing 7, for the venting of said cell housing 7. At least one venting unit 8 may include at least one rupture membrane, which is not represented. The venting units 8 of the battery cells 3 in cell row 4 are arranged on the sides of said battery cells 3 which face the battery cells 3 in cell row 5, wherein the battery cells 3 in cell row 4 are arranged adjacently to the battery cells 3 in cell row 5. The venting units 8 of the battery cells 3 in cell row 5 are arranged on the sides of said battery cells 3 which face the battery cells in cell row 4, wherein the battery cells 3 in cell row 5 are arranged adjacently to the battery cells 3 in cell row 4. The battery cells 3 within the respective cell rows 4 or 5 are connected in series, in a manner which is not represented in greater detail.

The battery unit 2 moreover includes two shield units 9 and 10, which are arranged between the sides of the mutually facing battery cells 3 in cell rows 4 and 5, or between the cell rows 4 and 5, and are arranged at a distance from one another. Each shield unit 9 or 10 includes a shield wall 11 having a number of openings 12 which corresponds to the number of battery cells 3 per cell row 4 or 5, and a corresponding number of closure elements 13. At least one shield wall 11 can be partially or entirely formed by a mica board.

The respective opening 12 in the respective shield wall 11 is arranged in alignment with the venting unit 8 of the respective battery cell 3 which is arranged closest to said shield wall 11 and to said opening 12.

The respective closure element 13 is arranged in a closed position, in which the closure element 13 closes the respective opening 12, as represented, for example, for all the closure elements 13 of the shield unit 9, and for a number of the closure units 13 of the shield unit 10. The respective closure element 13, in an open position in which the closure element 13 at least partially exposes the respective opening 12, is partially released from the respective shield wall 11, as represented for the central closure element 13 of the shield unit 10. Each closure element 13 is transferable from the closed position to the open position by the action thereon of a force which is directed in the direction of the other respective shield unit 9 or 10.

Each closure unit 13 is configured as a flap. At least one closure unit 13 may be partially or entirely formed by a mica board. At least one closure unit 13, in its closed position, may be connected to the respective shield wall 11 by at least one clamping mechanism, which is not represented. Alternatively or additionally, at least one closure unit 13, in its closed position, may be adhesively bonded to the respective shield wall 11. In the illustrated exemplary embodiment, each closure unit 13 is connected to the respective shield wall 11 by way of at least one hinge, which is not represented, wherein the hinge may be configured as a film hinge or as an adhesive tape, which is not represented.

In the illustrated exemplary embodiment, the central battery cell 3 in cell row 5 is subject to an internal short-circuit 16, as a result of which the battery cell 3 undergoes thermal runaway. As a result thereof, hot gas is generated in the battery cell 3. When a specific internal pressure within the cell housing 7 of the battery cell 3 is reached, the venting unit 8 opens abruptly, or the rupture membrane, which is not represented, of this venting unit 8 of the battery cell 3 fails. Gas 14 which exits the cell housing 7 via the venting unit 8 abruptly contacts the closure unit 13 which is arranged closest to the open venting unit 8. As a result, the closure element 13 is exposed to a force which is oriented in the direction of the other shield unit 9, and is thus transferred from its closed position to its open position. Gas 14 exiting the battery cell 3 can thus be passed through the shield unit 10, without further battery cells 3 in the cell row 5 being exposed to the hot gas 14. As the closure units 13 of the shield unit 9 are in their closed position, the battery cells 3 in cell row 4 are likewise not exposed to the hot gas 14. Instead, the hot gas 14 is only able to flow into the duct 16 formed between the shield units 9 and 10, in the direction indicated by the arrows 15, and is thus evacuated from the battery unit 2, without thermal escalation of further battery cells 3 in the battery unit 2 occurring.

Figure 2:
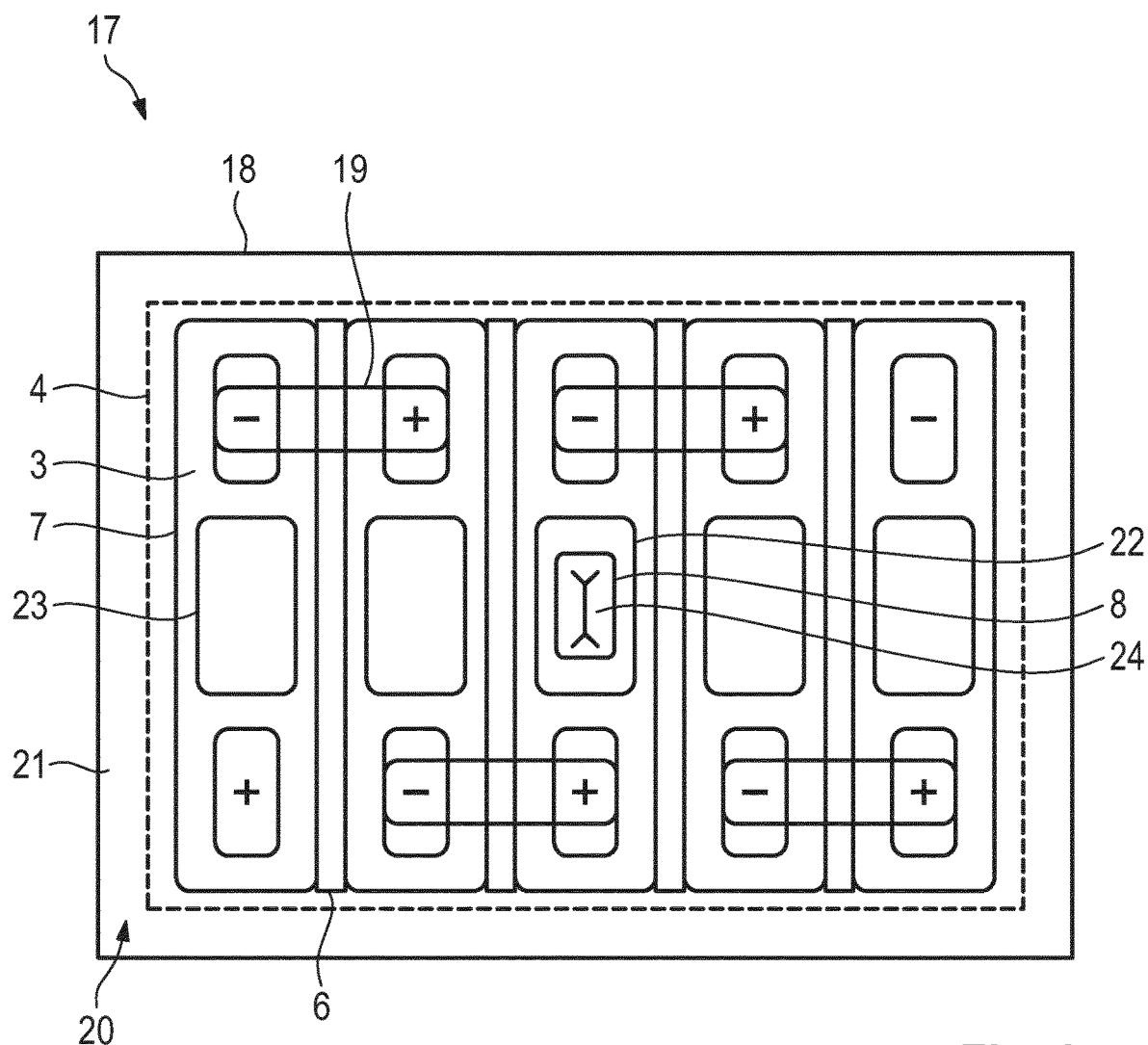
FIG. 2 is a schematic representation of a further exemplary embodiment of a traction battery according to the invention.

FIG. 2 shows a schematic representation of a further exemplary embodiment of a traction unit 17 according to the invention for a motor vehicle, which is not represented. The traction battery 17 comprises a battery unit 18. Alternatively, the traction battery 17 may include two or more battery units 18, although this arrangement is not represented.

The battery unit 18 includes a plurality of battery cells 3, wherein five battery cells 3 respectively are combined to form a cell row 4, and only one cell row is represented in FIG. 2. The other, unrepresented cell row is arranged in accordance with the cell row 4 in FIG. 1. The battery cells 3 in each cell row 4 are mutually spaced by way of spacer elements 6. The battery cells 3 in cell row 4 are arranged adjacently to the unrepresented battery cells in the unrepresented cell row.

Each battery cell 3 comprises a cell housing 7 and a venting unit 8, which is arranged on the cell housing 7, for the venting of said cell housing 7. Each venting unit 8 includes a rupture membrane 24. The venting units 8 of the battery cells 3 in cell row 4 are arranged on the sides of said battery cells 3 which face the battery cells 3 in the unrepresented cell row, wherein the battery cells 3 in cell row 4 are arranged adjacently to the unrepresented battery cells in the unrepresented cell row. The venting units 8 of the unrepresented battery cells in the unrepresented cell row are arranged on the sides of said battery cells which face the battery cells 3 in cell row 4, wherein the unrepresented battery cells in the unrepresented cell row are arranged adjacently to the battery cells 3 in cell row 4. The battery cells 3 in each respective cell row 4 are connected in series by way of cell connectors.

The battery unit 18 moreover includes two shield units 20, which are arranged between the sides of the mutually facing battery cells 3 in the cell rows 4, or between the cell rows 4, and are arranged at a distance from one another, wherein only one shield unit 20 is represented in FIG. 2. The shield units 20 can be arranged in relation to one another according to FIG. 1. Each shield unit 20 includes a shield wall 21 which, in FIG. 2, is represented as being transparent in order to clarify the design of the battery unit 18, and has a number of openings 22 which corresponds to the number of battery cells 3 per cell row 4, and a corresponding number of closure elements 23. At least one shield wall 21 may be partially or entirely formed by a mica board.

The respective opening 22 in the respective shield wall 21 is arranged in alignment with the venting unit 8 of the respective battery cell 3 which is arranged closest to said shield wall 21 and to said opening 22.

The respective closure element 23 is arranged on the respective shield wall 21 in a closed position, in which the closure element 23 closes the respective opening 22, as represented, for example, for the four outer closure elements 23 of the shield unit 20. The respective closure element 23, in an open position in which the closure element 23 at least partially exposes the respective opening 22, is entirely separated from the respective shield wall 21, as represented for the central closure element 23 of the shield unit 20. Each closure element 23 is transferable from the closed position to the open position by the action thereon of a force which is directed in the direction of the other respective shield unit 20.

Each closure unit 23 may be configured as a cover or flap. At least one closure unit 23 may be partially or entirely formed by a mica board. At least one closure unit 23, in its closed position, may be connected to the respective shield wall 21 by at least one clamping mechanism, which is not represented. Alternatively or additionally, at least one closure unit 23, in its closed position, may be adhesively bonded to the respective shield wall 21. Alternatively or additionally, at least one closure unit 13 may be connected to the respective shield wall 21 by way of at least one hinge, which is not represented, wherein the hinge may be configured as an unrepresented film hinge or as an unrepresented adhesive tape.

LIST OF REFERENCE NUMBERS

1 Traction battery
2 Battery unit
3 Battery cell
4 Cell row
5 Cell row
6 Spacer element
7 Cell housing
8 Venting unit
9 Shield unit
10 Shield unit
11 Shield wall
12 Opening
13 Closure unit
14 Discharged gas
15 Arrow (direction of flow of 14)
16 Short-circuit in 3
17 Traction battery
18 Battery unit
19 Cell connector
20 Shield unit
21 Shield wall
22 Opening
23 Closure unit
24 Rupture membrane The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery unit for a traction battery of a motor vehicle, comprising:
    at least two battery cells arranged adjacently to one another, each of which comprises at least one venting unit for venting a cell housing thereof, wherein
        the venting units are arranged on mutually facing sides of the battery cells,
        at least two shield units are arranged between the mutually facing sides of the battery cells and are arranged at a distance from one another,
        each of the at least two shield units comprises a shield wall having at least one opening and at least one closure element,
        the opening of each shield wall is arranged in alignment with the venting unit of the battery cell arranged closest to the shield wall in each case,
        the closure element, in a closed position in which the closure element closes the opening, is arranged in parallel alignment with the shield wall and, in an open position, in which the closure element at least partially reveals the opening, is at least partially separated from the shield wall,
        the closure element is transferable from the closed position into the open position by an action thereon of a force directed in a direction of the other respective shield unit, and
        at least one closure unit, in its closed position, is connected to the respective shield wall via at least one clamp mechanism.

2. The battery unit according to claim 1, wherein at least one shield wall is at least partially formed by a mica board.

3. The battery unit according to claim 1, wherein at least one closure unit is at least partially formed by a mica board.

4. The battery unit according to claim 3, wherein at least one closure unit is configured as a flap.

5. The battery unit according to claim 4, wherein at least one closure unit, in its closed position, is adhesively bonded to the respective shield wall.

6. The battery unit according to claim 4, wherein at least one closure unit is connected to the respective shield wall via at least one hinge.

7. The battery unit according to claim 6, wherein the hinge is configured as an adhesive tape.

8. The battery unit according to claim 1, wherein at least one closure unit is configured as a flap.

9. The battery unit according to claim 1, wherein at least one closure unit, in its closed position, is adhesively bonded to the respective shield wall.

10. The battery unit according to claim 1, wherein at least one closure unit is connected to the respective shield wall via at least one hinge.

11. The battery unit according to claim 1, wherein at least one venting unit comprises at least one rupture membrane.

12. A traction battery for a motor vehicle, comprising:
at least one battery unit according to claim 1.

13. The battery unit according to claim 1, wherein
the closure element at least partially reveals the opening by reversibly pivoting.

14. A battery unit for a traction battery of a motor vehicle, comprising:
at least two battery cells arranged adjacently to one another, each of which comprises at least one venting unit for venting a cell housing thereof, wherein
the venting units are arranged on mutually facing sides of the battery cells,
at least two shield units are arranged between the mutually facing sides of the battery cells and are arranged at a distance from one another,
each of the at least two shield units comprises a shield wall having at least one opening and at least one closure element,
the opening of each shield wall is arranged in alignment with the venting unit of the battery cell arranged closest to the shield wall in each case,
the closure element, in a closed position in which the closure element closes the opening, is arranged in parallel alignment with the shield wall and, in an open position, in which the closure element at least partially reveals the opening, is at least partially separated from the shield wall,
the closure element is transferable from the closed position into the open position by an action thereon of a force directed in a direction of the other respective shield unit,
at least one closure unit is connected to the respective shield wall via at least one hinge, and
the hinge is configured as an adhesive tape.

15. The battery unit according to claim 14, wherein
the closure element at least partially reveals the opening by reversibly pivoting.

* * * * *